OR  3,981,560

United States Patent [19]
Heyman et al.

[11] 3,981,560
[45] Sept. 21, 1976

[54] ELECTROCHROMIC DISPLAY DEVICE

[75] Inventors: Philip Michael Heyman; Robert Leon Quinn, both of Trenton; Istvan Gorog, Princeton, all of N.J.

[73] Assignee: RCA Corporation, New York, N.Y.

[22] Filed: June 16, 1975

[21] Appl. No.: 587,428

[52] U.S. Cl. .............................. 350/160 R; 340/336
[51] Int. Cl.² ........................................... G02F 1/36
[58] Field of Search .............. 350/160; 340/366, 336

[56] References Cited
UNITED STATES PATENTS 3,521,941   7/1970   Deb et al. ........................... 350/160
3,839,857   10/1974   Berets et al. ........................ 350/160

*Primary Examiner*—William L. Sikes
*Attorney, Agent, or Firm*—Glenn H. Bruestle; Carl L. Silverman

[57] ABSTRACT

An electrochromic display device includes an electrolyte and at least one transparent electrically conductive electrode. An organic insulating layer e.g. a photoresist material, is disposed between the transparent electrode and the electrolyte such that no portion of the transparent electrode is in contact with the electrolyte. The insulating layer protects the transparent electrode from deterioration so as to increase the lifetime of the transparent electrode.

11 Claims, 5 Drawing Figures

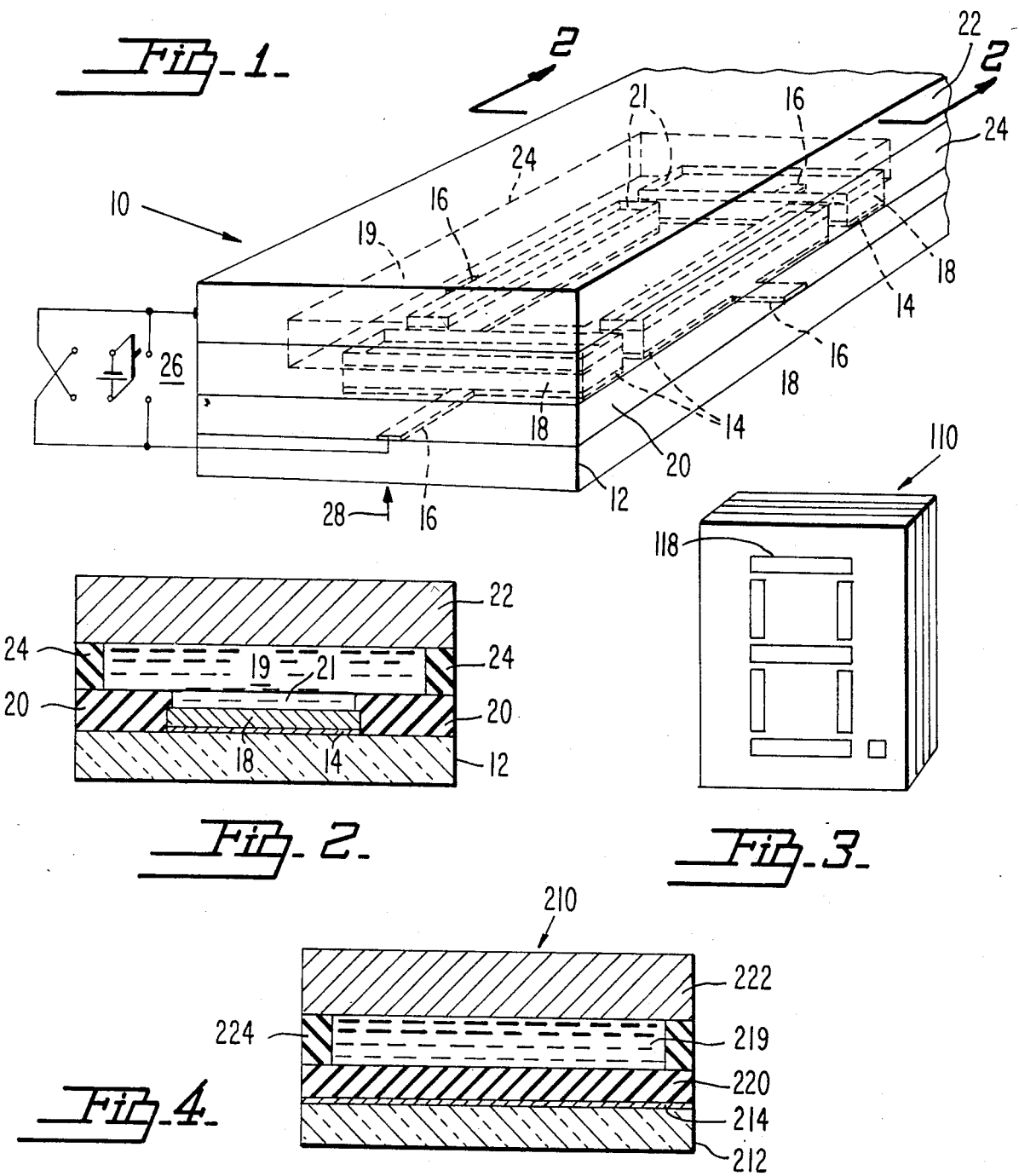
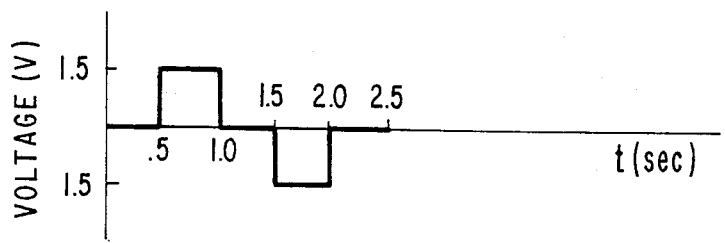

ELECTROCHROMIC DISPLAY DEVICE

BACKGROUND OF THE INVENTION

The present invention relates to an electrochromic display device, and particularly to such a display device having an organic insulating layer for increasing the lifetime of the transparent electrodes.

Electrochromic devices are well-known devices which exhibit a phenomenon known as "persistent electrochromism", e.g., see U.S. Pat. No. 3,521,941 entitled, "Electro-Optical Device Having Variable Optical Density", issued July 28, 1970. The term "persistent electrochromism" denotes the property of a material whereby its electromagnetic radiation absorption characteristic can be altered, in most instances, even at ambient temperature. In order to alter the absorption characteristic, an electric field is provided such that an electric current flows through the electrochromic material. Such materials, for example, may exhibit little or no absorption of visible wavelength in the unswitched state, and therefore be transparent, but when subjected to an electric switching current, effectively absorb in the red end of the spectrum, turning blue in color. Similar effects can be observed in other portions of the electromagnetic spectrum, invisible as well as visible.

The phenomenon of "persistent electrochromism" has also been exhibited in electrochromic devices which include an electrolyte-electrochromic sandwich wherein the electrolyte functions both as a conductive medium and as a source of positive ions. For example, the sulfuric acid electrolyte of U.S. Pat. No. 3,708,220, issued Jan. 2, 1973. In these devices, the electrolyte is chosen to be sufficiently conductive so as to permit low voltage operation of the electrochromic device while also being chemically compatible with the electrochromic layer and electrode employed in the device.

Such display devices have been developed and may be successful for many applications, e.g., alpha-numeric displays. In the construction of an electrochromic alpha-numeric cell, it is usually necessary to etch patterns in the transparent front electrode. When the complete cell is assembled, there are regions where the electrolyte is sandwiched between the transparent electrode and a counter electrode. In these regions, wasteful leakage current flows when a voltage is applied. If inorganic acids, such as sulfuric or phosphoric acid, are used to increase the conductivity of the electrolyte, then the leakage current will undesirably cause the transparent electrodes to be rapidly etched away. Thus, devices which employ the electrolyte have been found to operate well only for a rather limited number of cycles i.e., several hundred thousand, as the direct contact of the electrolyte with the transparent electrodes appears to cause the transparent electrodes to deteriorate. The deterioration causes lack of complete switching in the display and eventually, failure. Thus, it would be desirable to develop an electrochromic display device in which the transparent electrodes exhibit an increased lifetime, i.e., continued operation without any significant degradation.

SUMMARY OF THE INVENTION

An electrochromic device includes a substantially transparent substrate with at least one substantially transparent electrically conductive electrode on the substrate. A layer of electrochromic material is on the electrode and an electrolyte is on the layer of electrochromic material. An organic insulating layer is disposed between the transparent electrode and the electrolyte. A counter electrode is spaced from the transparent electrode and is in contact with the electrolyte.

BRIEF DESCRIPTION OF THE DRAWINGS

FIG. 1 is an isometric view of a portion of one form of an electrochromic display device of the present invention.

FIG. 2 is a sectional view taken along line 2—2 of the electrochromic display device of FIG. 1.

FIG. 3 is an isometric view of one form of an electrochromic display device of the present invention.

FIG. 4 is a cross-sectional view of a test cell which includes an insulating layer which is useful in the electrochromic display device of the present invention.

FIG. 5 is a graph showing a conventional biasing voltage waveform suitable for operating electrochromic display devices.

DETAILED DESCRIPTION OF THE INVENTION

Referring initially to FIGS. 1 and 2, a portion of one form of an electrochromic display device of the present invention is generally designated as 10. The electrochromic display device 10 includes a transparent substrate 12, such as glass, having a plurality of transparent conductive electrodes 14 segmented in a typical segment display. The transparent electrodes 14 include terminal portions 16 which are utilized in activating suitable ones of the electrodes 14. The transparent electrodes 14 may be of a material having high conductivity and high transmissivity, such as tin-doped indium oxide. A layer 18 of electrochromic material, such as tungsten oxide, is on each of the electrodes 14 so as to constitute the desired display pattern, i.e., each layer 18 of electrochromic material corresponds to a discretely addressable display segment 18. An electrolyte 19, such as one which includes sulfuric acid or phosphoric acid, is in contact with a surface of the layer 18 of electrochromic material. The electrolyte 19 may be in the form of a gel, as in previously mentioned U.S. Pat. No. 3,708,220.

In accordance with the present invention, an organic insulating layer 20 is disposed between the transparent electrodes 14 (and terminal portions 16) and the electrolyte 19 such that no portion of the transparent electrode 14 (and terminal portion 16) is in contact with the electrolyte 19, as shown in FIGS. 1 and 2. The organic insulating layer 20 is patterned such that the layer 18 of electrochromic material is in contact with the electrolyte 19, i.e., the insulating layer 20 does not cover the layer 18 of electrochromic material since the layer (segment) 18 of electrochromic material which is in contact with the electrolyte 19 functions as the display area. Thus, the organic insulating layer 20 includes openings 21 which correspond to the display area provided by the layer 18 of electrochromic material.

A counter electrode 22 is spaced from the transparent electrodes 14 and in contact with the electrolyte 19. A spacer 24, of a material which is inert to the electrolyte 19, e.g., a plastic, may be utilized to maintain the counter electrode 22 in the desired position. The spacer 24 also functions to contain the electrolyte 19 in place. The counter electrode 22 may be of a material such as graphite alone, or in admixture with an electrochromic material as described in U.S. Pat. No. 3,827,784 entitled, "Simple, Bonded Graphite Counter Electrode For Electrochromic Devices", issued Aug. 6, 1974.

The organic insulating layer 20 may be a photoresist material since photoresist materials are easily available as well as relatively inexpensive. By photoresist it is meant a material whose solubility in a particular solvent changes upon exposure to electromagnetic radiation, e.g., ultraviolet light. As is known in the art, photoresists may be classified as negative or positive. Negative photoresists are those in which areas exposed to light are polymerized and remain; positive photoresists are those in which areas exposed to light are softened and removed. For example, suitable insulating layers 20 include the photopolymer film resists commercially marketed by Eastman Kodak under the trademarks KMER and KTFR, both of which are based on the cross linking of a polymerized isoprene dimer, i.e. partially cyclized cis-polyisoprene. For further information on photoresist materials, see U.S. Pat. No. 3,808,155, entitled "Additives To Negative Photoresists Which Increase The Sensitivity Thereof", issued Apr. 30, 1974. Since the display device 10 may be used in lighted environments, it is preferable to employ negative photoresist materials so as to prevent deterioration of the photoresist material. It may also be preferable to utilize the phenomena known as color contrast in which the display contrast is improved through the use of the appropriate color relation, e.g., a yellow photoresist such as KMER, with a blue electrochromic material, such as tungsten oxide.

In the use of the electrochromic device 10 of FIG. 1, an electric field is provided so as to cause a current to flow through the device 10. The segments 18 of electrochromic material desired to be colored are each provided with a negative electrical potential through the transparent electrodes 14, the terminal portions 16, and an electrical biasing network 26. The counter electrode 22 is provided with a positive electrical potential. Erasure of the desired segment(s) 18 can be accomplished by reversing the polarity, as is known in the art. For ease of description, only one segment 18 is shown connected to the biasing network 26. The display is viewed by looking into and through the transparent substrate 12, as indicated by the arrow 28 in FIG. 1. If desired, additional segments 118 of electrochromic material may be provided as in conventional alphanumeric displays 110 as shown in FIG. 3.

The electrochromic display device 10 of FIGS. 1 and 2 can be constructed through methods well known in the art. For example, the transparent electrodes 14, e.g., tin-doped indium oxide, can be formed on a transparent substrate 12, such as glass, utilizing conventional deposition and etching processes. The layer 18 of electrochromic material, such as tungsten oxide, having a thickness of about 5,000A (0.5 micron), can then be deposited, e.g. evaporated or sputtered through a mask, onto the transparent electrodes 14. For a simple and precise application of the organic insulating layer 20, it is desirable to employ a conventional photoresist material, such as the previously mentioned photopolymers marketed under the trademarks KMER and KTFR by Eastman Kodak. Conventional deposition techniques, e.g., dip coating or spraying, and conventional exposure development techniques can be employed to deposit the photoresist materials.

Typically, the deposited photoresist material, i.e., organic insulating layer 20, has a thickness of about 0.1 microns to 2 microns, although other thicknesses are possible. For the purposes of the electrochromic display device 10 of the present invention, the deposited pattern of the organic insulating layer 20 of photoresist material is not used merely as a mask which is subsequently removed after performing its masking function. The organic insulating layer 20 is used as a permanent layer that exists in the completed device 10. It may be preferable to pattern the organic insulating layer 20 on the marginal areas of the electrochromic layer 18, so as to insure that no portion of the transparent electrodes 14 is in contact with the electrolyte 19, as shown in FIG. 2. Consequently, it may be desirable to employ an insulating material capable of making a good seal to the electrochromic material. For example, the previously mentioned photoresist materials KTFR and KMER are both capable of making the desired seal.

The electrolyte 19, such as sulfuric acid or phosphoric acid, can be prepared and applied onto the electrochromic layer 18, as is well known in the art. The acid electrolyte 19 can be in the range of from about 0.5 molarity (M) to about 5M, with about 2M being typical. To enhance contrast between the colored and uncolored states, a pigment, e.g., white titanium dioxide, may be added to the electrolyte 19. The counter electrode 22, e.g., graphite on stainless steel, and the inert spacer 24 are readily available commercially.

Several test cells were fabricated, each having a different insulating layer. As shown in FIG. 4, each of the test cells 210 included all of the elements of an actual cell except for the layer of electrochromic material. One test cell was fabricated without an insulating layer. The other test cells included various insulating layers. Although the test cells did not include an electrochromic layer, we believe the environment in the test cells to be substantially the same as the environment in an operating electrochromic display device. Each of the cells were constructed as previously discussed. The cells included a 2M phosphoric acid electrolyte. Some of the materials chosen for the insulating layer were those suggested in U.S. Pat. No. 3,836,229 entitled, "Electro-Optical Display Device", issued Sept. 17, 1974. The materials suggested for the insulating layer in the above-mentioned patent were all inorganic and were to function to prevent an excess density of current on the edges of the electrochromic layer so as to prevent erosion of the electrochromic layer. The cells were tested under a conventional biasing voltage, i.e., a dc voltage of $\pm 1\frac{1}{2}$ V with an on time of ½ second and an off time of ½ second, as shown in FIG. 5. The performance, i.e., lifetime, of the test cells which include the organic insulating layer of the present invention surpassed the other test cells, as shown in Table I below. It should be noted that since there are $0.5\times 10^6$ minutes in 1 year, $10^7$ cycles represents 20 years of minutes.

Table I

Comparison of Performance of
Test Cells Using Various Insulating Layers

| | Insulating layer | Lifetime (cycles) |
|---|---|---|
| | None | $6 \times 10^4$ |
| 1 | $CaF_2$ | $8 \times 10^4$ |
| 2 | $MgF_2$ | $8 \times 10^4$ |
| 3 | SiO | $1.4 \times 10^5$ |
| 4 | $SiO_2$ | $1.8 \times 10^5$ |
| 5 | KMER Photoresist | $>10^7$ |
| 6 | KTFR Photoresist | $>10^7$ |

Upon examining the test cells, it was observed that when the transparent electrode was not protected by an appropriate insulating layer, the cross sectional area of the electrode was reduced by the etching action of the electrolyte. This is undesirable since the decreased cross section exhibits an increased electrical resistance. It is believed that the increased resistance decreases the degree of coloration which can be obtained in an actual electrochromic device. Ultimately, the cross sectional area of the electrode is decreased to the point where device failure occurs.

The invention can be further illustrated by the following example, but it is to be understood that the invention is not meant to be limited to the details described therein.

EXAMPLE I

The desired transparent electrode pattern was etched on a tin doped indium oxide coated glass substrate. The patterned substrate was carefully cleaned and placed in a vacuum system where 10,000A of tungsten oxide was evaporated through a mask so as to be deposited on the transparent electrode pattern. The substrate was then dip coated with KTFR photoresist, commercially available from Eastman Kodak. The photoresist layer was about 1.5 microns in thickness. The appropriate insulator pattern was exposed and developed, leaving the tungsten oxide exposed in the display areas of the cell. A plastic spacer was attached to the substrate and filled with an electrolyte. The electrolyte was 2M phosphoric acid. A counter electrode of aquadag coated stainless steel was clamped onto the cell. The edges of the cell were sealed with epoxy in order to maintain the consistency of the electrolyte.

The electrochomic display device operated in excess of $10^6$ cycles without any observable deterioration of the transparent electrodes.

GENERAL CONSIDERATIONS

Thus, it has been found that organic materials are well suited for use as protective layers in electrochromic devices which include electrolytes. The suitable materials disclosed are exemplary only. Many other well known materials could be substituted. Suitable materials would include insulating materials capable of producing protective layers which are relatively impervious to the acid electrolytes and capable of precise deposition. Consequently, it is believed that most organic materials are suitable, especially for use with inorganic acid electrolytes. Also, as is apparent, it is desirable that the material be capable of forming pin hole free layers. In addition, as previously mentioned, it may be preferable to employ a material which can make a good seal to the electrochromic layer.

Photoresist materials are well suited for use as the insulating material since they can be easily and precisely deposited. However, although the electrochromic display device has been described with particular photoresist materials as the organic insulating layer, other photoresist materials may be substituted, e.g., such as the photoresist materials commercially available from Hunt Chemical Corporation under the trademark Waycoat. Also, the photoresist material employed may be negative working or positive working. Furthermore, the exact composition of the photoresist material is not critical. Consequently, the photoresist material may include additives such as those described in previously mentioned U.S. Pat. No. 3,808,155.

Although the electrochromic device of the present invention has been described having a tungsten oxide electrochromic layer, it is apparent that tungsten oxide is merely one of the many known electrochromic materials, such as those described in previously mentioned U.S. Pat. No. 3,521,941. Also, although the electrochromic device of the present invention has been described with a phosphoric acid electrolyte, other electrolytes may also be employed, e.g., sulfuric acid. Thus, electrochromic display devices of the present invention include transparent electrodes which exhibit an increased lifetime.

We claim:
1. An electrochromic display device comprising:
   a substantially transparent substrate,
   at least one substantially transparent electrically conductive electrode on said substrate,
   a layer of electrochromic material partially covering said electrode,
   an organic insulating layer substantially covering the uncovered portion of said transparent electrode, and
   an electrolyte on said layer of electrochromic material with said insulating layer substantially preventing said electrolyte from contacting said transparent electrode, and
   a counter electrode spaced from said transparent electrode, said counter electrode being in contact with said electrolyte.
2. An electrochromic display device in accordance with claim 1 in which said insulating layer includes at least one opening through which said layer of electrochromic material is in contact with said electrolyte.
3. An electrochromic display device in accordance with claim 1 in which said electrolyte includes an acid.
4. An electrochromic display device in accordance with claim 3 in which said electrolyte includes phosphoric acid.
5. An electrochromic display device in accordance with claim 3 in which said transparent electrode comprises tin doped indium oxide.
6. An electrochromic display device in accordance with claim 3 in which said layer of electrochromic material comprises tungsten oxide.
7. An electrochromic display device in accordance with claim 3 in which said insulating layer is a photoresist material.
8. An electrochromic display device in accordance with claim 7 in which said insulating layer is a negative photoresist material.
9. An electrochromic display device in accordance with claim 8 in which said photoresist material is of a color which contrasts with the color of said layer of electrochromic material when said electrochromic material is in a colored state.
10. An electrochromic display device in accordance with claim 8 in which said insulating layer comprises a partially cyclized cis-polyisoprene.
11. An electrochromic display device in accordance with claim 1 which includes a plurality of said transparent electrodes.

* * * * *